United States Patent
Ekstedt et al.

[11] Patent Number: 5,323,604
[45] Date of Patent: Jun. 28, 1994

[54] TRIPLE ANNULAR COMBUSTOR FOR GAS TURBINE ENGINE

[75] Inventors: Edward E. Ekstedt, Montgomery; Narendra D. Joshi; Adrian M. Ablett, both of Cincinnati; Timothy R. Gresla; John M. Koshoffer, both of Cincinnati, all of Ohio; William F. Burke, Marlborough, Conn.

[73] Assignee: General Electric Company, Cincinnati, Ohio

[21] Appl. No.: 976,752

[22] Filed: Nov. 16, 1992

[51] Int. Cl.⁵ .................... F23R 3/34; F02C 7/228
[52] U.S. Cl. .................... 60/39.36; 60/747; 60/748
[58] Field of Search .......... 60/39.36, 733, 737, 60/746, 747, 752, 756, 757, 39.37, 748

[56] References Cited

U.S. PATENT DOCUMENTS

| | | |
|---|---|---|
| 2,996,884 | 2/1960 | Johnson et al. |
| 3,032,990 | 5/1962 | Rogers. |
| 3,236,048 | 2/1966 | Spears, Jr. .................... 60/746 |
| 3,714,778 | 2/1973 | Howald .................... 60/747 |
| 3,720,058 | 3/1973 | Collinson et al. .................... 60/748 |
| 3,724,207 | 4/1973 | Johnson. |
| 3,910,035 | 10/1975 | Juhasz et al. .................... 60/39.23 |
| 3,915,387 | 10/1975 | Caruel et al. |
| 3,943,705 | 3/1976 | DeCorso et al. |
| 3,980,233 | 9/1976 | Simmons et al. |
| 4,092,826 | 6/1978 | Pask. |
| 4,100,733 | 7/1978 | Striebel et al. |
| 4,107,918 | 8/1978 | Andrew et al. |
| 4,180,972 | 1/1980 | Herman et al. |
| 4,194,358 | 3/1980 | Stenger .................... 60/39.06 |
| 4,302,932 | 12/1981 | Kuznetsov et al. |
| 4,356,698 | 11/1982 | Chamberlain .................... 60/737 |
| 4,373,342 | 2/1983 | Willis et al. .................... 60/748 |
| 4,455,840 | 6/1984 | Matt et al. .................... 60/747 |
| 4,805,411 | 2/1989 | Hellat et al. .................... 60/746 |
| 4,967,561 | 11/1990 | Bruhwiler et al. .................... 60/746 |
| 4,991,398 | 2/1991 | Clark et al. .................... 60/748 |
| 5,020,329 | 6/1991 | Ekstedt et al. |
| 5,195,315 | 3/1993 | Holladay .................... 60/39.36 |

FOREIGN PATENT DOCUMENTS 259331 10/1990 Japan .................... 60/737

OTHER PUBLICATIONS

"Asea Brown Boveri introducing a dual fuel dry low-NOx burner design", by Eric Jeffs; Gas Turbine World, May–Jun. 1989.

*Primary Examiner*—Richard A. Bertsch
*Assistant Examiner*—Timothy S. Thorpe
*Attorney, Agent, or Firm*—Jerome C. Squillaro; Charles L. Moore, Jr.

[57] ABSTRACT

In accordance with one aspect of the present invention, a combustor is disclosed having three separate domes, each dome having disposed therein a plurality of circumferentially spaced mixers for uniformly mixing air and fuel. The combustor utilizes a high percentage of the total available combustion air at the dome area in order to maintain a lean mixture of air and fuel during all levels of engine output. Besides providing an unobstructed area in the diffuser dump region upstream of the mixers for the combustion air, sealing means is included to prevent cooling air from entering the combustion chamber until downstream of the primary combustion zone. Heat shields having radial centerbodies are also included between each dome to isolate each primary combustion zone.

21 Claims, 8 Drawing Sheets

TRIPLE ANNULAR COMBUSTOR FOR GAS TURBINE ENGINE

BACKGROUND OF THE INVENTION

1. Field of the Invention

The present invention relates to a combustor for a gas turbine engine, and, more particularly, to a triple annular combustor for a gas turbine engine having extremely low emission levels without the aid of water or steam injection.

2. Description of Related Art

Air pollution concerns worldwide have led to stricter emissions standards requiring significant reductions in gas turbine pollutant emissions, especially for industrial and power generation applications. Nitrous Oxide (NOx), which is a precursor to atmospheric pollution, is generally formed in the high temperature regions of the gas turbine combustor by direct oxidation of atmospheric nitrogen with oxygen. Reductions in gas turbine emissions of NOx have been obtained by the reduction of flame temperatures in the combustor, such as through the injection of high purity water or steam in the combustor. Additionally, exhaust gas emissions have been reduced through measures such as selective catalytic reduction. While both the wet techniques (water/steam injection) and selective catalytic reduction have proven themselves in the field, both of these techniques require extensive use of ancillary equipment. Obviously, this drives the cost of energy production higher. Other techniques for the reduction of gas turbine emissions include "rich burn, quick quench, lean burn" and "lean premix" combustion, where the fuel is burned at a lower temperature.

In the typical aircraft gas turbine engine, flame stability and variable cycle operation of the engine dominate combustor design requirements. This has in general resulted in combustor designs with the combustion at the dome end of the combustor proceeding at the highest possible temperatures during stoichiometeric conditions. This, in turn, leads to large quantities of NOx being formed in such gas turbine combustors since it has been of secondary importance.

In a typical industrial gas turbine engine, fuel is burned in a single annular combustor. At maximum power, the combustor dome region is very rich with fuel, and the local fuel-air ratios can be as high as one and one-half times the stoichiometric value. These high fuel-air ratios result in extremely high flame temperatures which provide rapid combustion and excellent flame stability. However, the high flame temperature also causes the formation of large quantities of NOx resulting from oxidation of the atmospheric nitrogen since the rate of production of NOx is an exponential function of the flame temperature. Because the dome fuel-air ratio of a conventional combustor is so high at full power, the combustor is still capable of good performance at low power where the fuel-air ratios are much lower.

Further, approximately one-third of the total combustor air available is typically used in the dome region for combustion. A large portion of this total combustor air (approximately one-fifth) is used to film cool the dome region. This large quantity of cooling air is acceptable for good performance with the rich primary zones of conventional combustors, but results in increased low power emissions such as carbon monoxide (CO) and unburned hydrocarbons (UHC) as well as potential early flame blowout. It should be noted that by "total combustion air" it is meant all of the compressed airflow supplied to the combustor from the diffuser except that allocated for cooling the turbine.

The combustor of the present invention pertains to the design of a dome and fuel technique utilizing the lean premixed concept of fuel and air during all stages of operation. In order to provide low fuel-air ratios at maximum power (where the fuel flow rate is high), the combustor of the present invention utilizes approximately 80–90% of the total combustion air in the dome. Further, the volume of the present combustor was increased over traditionally compact aeroderivative combustors in order to increase residence times to achieve low CO and UHC. Accordingly, a large number of fuel/air mixers is required to accommodate this high dome flow. This is accomplished by providing three domes or banks having a number of fuel/air mixers positioned therein. Consequently, the combustor is able to operate in a temperature range which minimizes NOx, CO, and UHC.

Accordingly, a primary objective of the present invention is to provide a combustor for a gas turbine engine which produces reduced levels of emissions without the aid of water or steam injection.

Another objective of the present invention is to provide a combustor which can accommodate an extremely high percentage of the total combustion air to provide low fuel-air ratios at maximum power.

Yet another objective of the present invention is to provide a combustor which has the flexibility to accommodate various schemes for staging fuel therein.

Another objective of the present invention is to provide a combustor which minimizes the nonuniformity of combustor air supplied to the fuel/air mixers.

A further objective of the present invention is to provide a combustor which can be easily assembled and disassembled for maintenance purposes.

Still another objective of the present invention is to provide a combustor which utilizes mixers that maximize mixing of fuel and air.

Another objective of the present invention is to provide a combustor which minimizes the amount of cooling air that enters the combustor primary zone to prevent quenching the lean combustion gases.

These objectives and other features of the present invention will become more readily apparent upon reference to the following description when taken in conjunction with the following drawing.

SUMMARY OF THE INVENTION

In accordance with one aspect of the present invention, a combustor is disclosed having three separate domes, each dome having disposed therein a plurality of circumferentially spaced mixers for uniformly mixing air and fuel. The combustor utilizes a high percentage of the total available combustion air at the dome area in order to maintain a lean mixture of air and fuel during all levels of engine output. Besides providing an unobstructed area in the diffuser dump region upstream of the mixers for the combustion air, sealing means is included to prevent cooling air from entering the combustion chamber until downstream of the primary combustion zone. Heat shields having circumferential centerbodies are also included between each dome to isolate each primary combustion zone.

BRIEF DESCRIPTION OF THE DRAWING

While the specification concludes with claims particularly pointing out and distinctly claiming the present invention, it is believed that the same will be better understood from the following description taken in conjunction with the accompanying drawing in which:

DETAILED DESCRIPTION OF THE INVENTION

Figure 1:
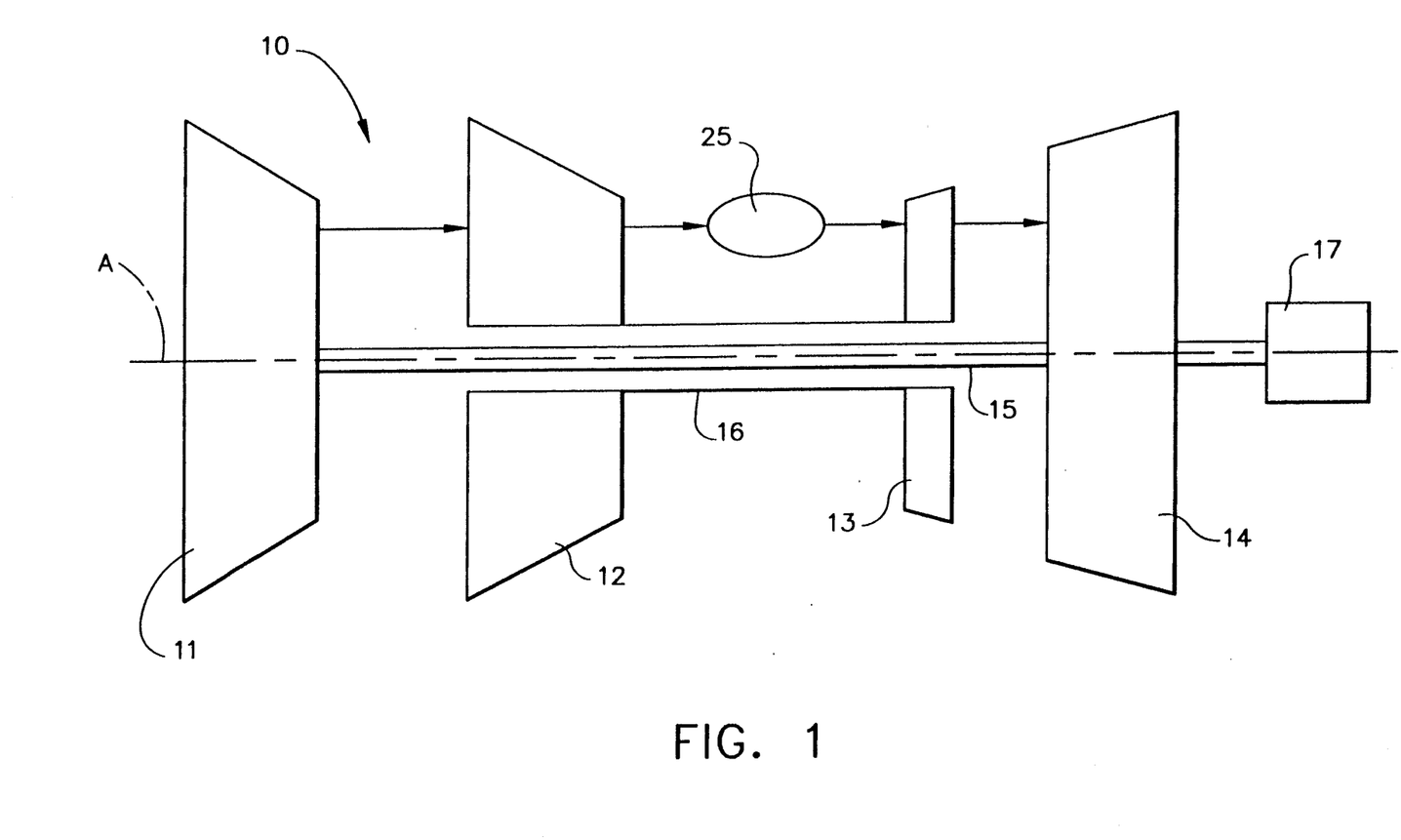
FIG. 1 is a cross-sectional, schematic view of an aeroderivative gas turbine engine including the combustor of the present invention.

Referring now to the drawings in detail, wherein identical numerals indicate the same elements throughout the figures, FIG. 1 depicts an aeroderivative gas turbine engine 10 of the type having a low pressure compressor 11, a high pressure compressor 12 downstream of low pressure compressor 11, a combustor 25 of the present invention downstream of high pressure compressor 12, a high pressure turbine 13 downstream of combustor 25, and a low pressure turbine 14 downstream of high pressure turbine 13. The elements of gas turbine engine 10 rotate about a longitudinal axis A. The standard configuration for engines of this type is a dual concentric shafting arrangement, whereby low pressure turbine 14 is drivingly connected to low pressure compressor 11 by a shaft 15 and high pressure turbine 13 is similarly drivingly connected to high pressure compressor 12 by a second shaft 16 internal and concentric to shaft 15. In the gas turbine depicted in FIG. 1, low pressure turbine 14 is connected directly to low pressure compressor 11 and a load 17. An example of such an engine is manufactured by General Electric Company of Evendale, Ohio under the designation LM6000. While the combustor of the present invention is described as being utilized with the aeroderivative gas turbine engine of FIG. 1, it will be understood that it can also be utilized with marine and industrial gas turbine engines of other configurations, such as one including a separate power turbine downstream of low pressure turbine 14 connected to a load (e.g., the LM5000 manufactured by General Electric Company) or a single compressor-turbine arrangement (e.g., the LM2500 manufactured by General Electric Company), as well as aeronautical gas turbine engines and heavy duty gas turbine engines when modified appropriately.

Figure 2:
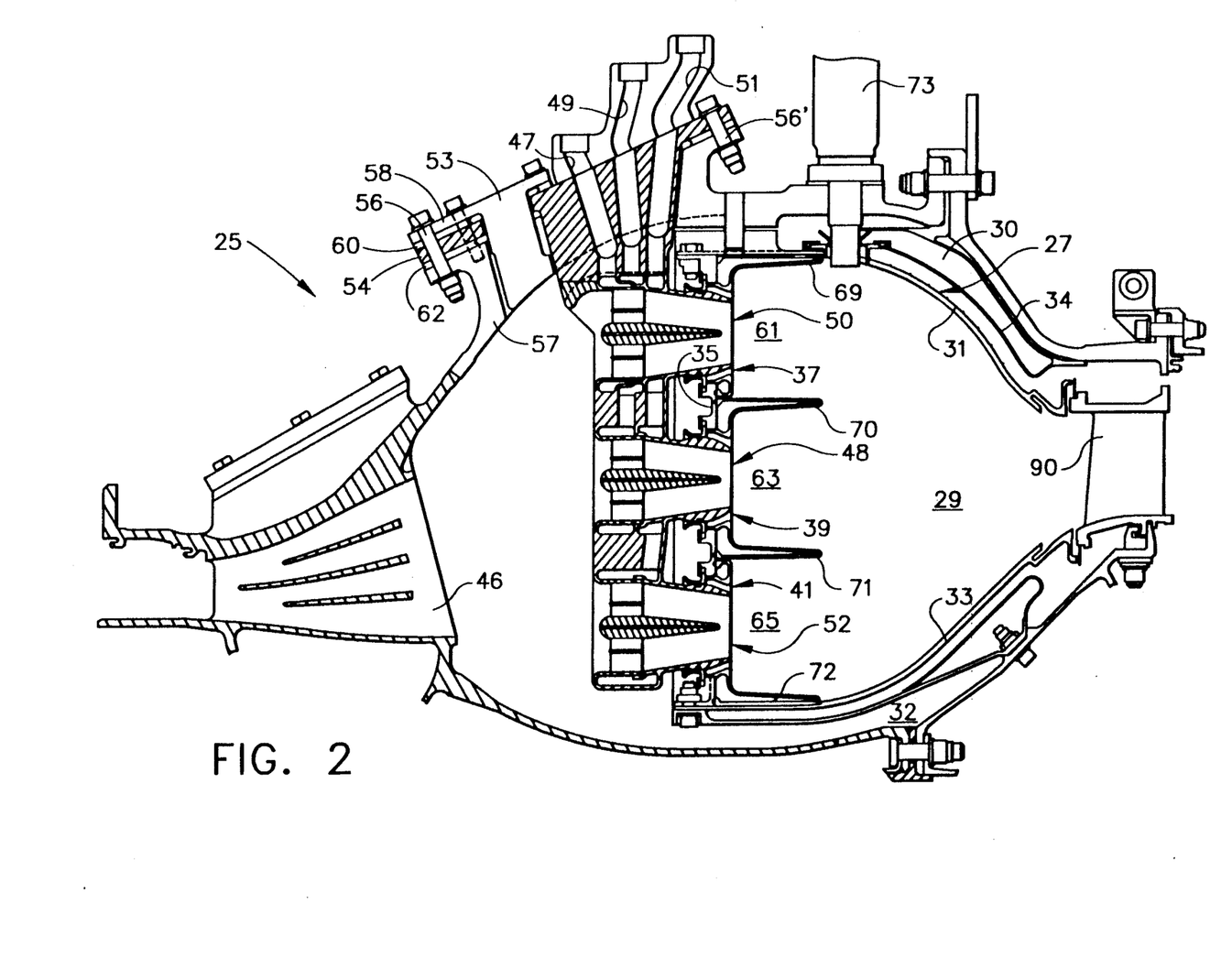
FIG. 2 is a cross-sectional view through the triple annular combustor structure of the present invention.
Figure 3:
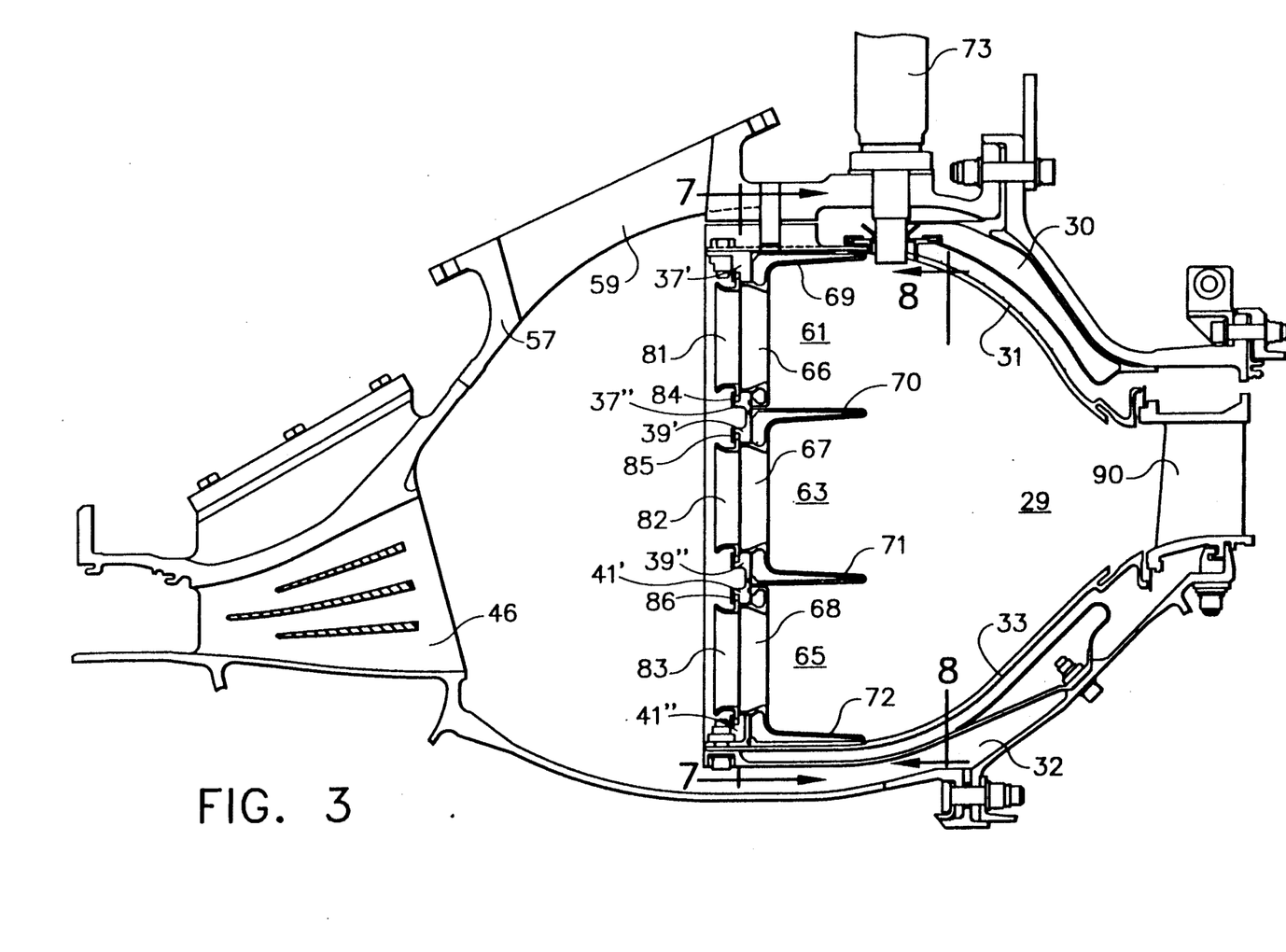
FIG. 3 is a cross-sectional view of the combustor of FIG. 2 with the mixer/fuel manifold assembly removed for clarity.

FIG. 2 depicts combustion apparatus 25 of the present invention which comprises a hollow body 27 defining a combustion chamber 29 therein. Hollow body 27 is generally annular in form and is comprised of an outer liner 31, an inner liner 33, and a domed end or dome plate 35. In the present annular configuration, domed end 35 of hollow body 27 includes three separate radial domes—outer dome 37, middle dome 39, and inner dome 41. As best seen in FIG. 3, outer dome 37 includes an outer end 37' which is fixedly joined to outer liner 31 and an inner end 37" spaced from outer end 37'. Middle dome 39 has an outer end 39' fixedly joined to outer dome inner end 37" and an inner end 39" spaced from middle dome outer end 39'. Inner dome 41 includes an outer end 41' fixedly joined to middle dome inner end 39" and an inner end 41" spaced from inner dome outer end 41' which is fixedly joined to inner liner 33. Combustor 25 is conventionally mounted to the engine casing (not shown) by means of dome plate 35. Each of domes 37, 39 and 41 include therein a plurality of openings 43 for receiving means for mixing air and fuel prior to entry into combustion chamber 29. Since the present combustion apparatus 25 is predicated on an extremely well mixed flame, the air/fuel mixing means is preferably a mixer in accordance with that disclosed in U.S. patent application Ser. No. 07/955,379, entitled "Air Fuel Mixer for Gas Turbine Engine," which was also filed by the Assignee of the present invention and is hereby incorporated by reference.

While it is known in the art to now include double annular combustors in aeronautical gas turbine engines, the present triple annular configuration is driven by the need to further reduce emissions produced during combustion. In this regard, combustor 25 incorporates a dome and fuel technique which utilizes the lean premix concept during all stages of combustor operation to maintain each combustion zone within a temperature range of 2500–3000° F. (By "lean premix," it is meant that the fuel/air mixture contains more air than is required to fully combust the fuel, or an equivalence ratio of less than one. It has been found that an equivalence ratio of 0.4 to 0.7 is preferred). This is accomplished by utilizing approximately 80–90% of the total combustion air supplied by a diffuser 46, which even results in low fuel-air ratios at maximum power when the fuel flow rate is very high. Diffuser 46 preferably is in accordance with that described in U.S. patent application Ser. No. 07/976,793, entitled "Flow Spreading Diffuser," which is also owned by the Assignee of the present invention and hereby incorporated by reference. In order to accommodate this high dome air flow, a large number of fuel/air mixers is required. Thus, domes or annuli 37, 39, and 41 are provided in the triple annular configuration as shown. This triple annular configuration is also consistent with the goal of reducing CO and UHC since its volume is approximately twice the size of a conventional combustor (approximately 8000 cubic inches) which, in turn, increases the residence time (preferably in the range of 2–5 milliseconds) of the air/fuel mixture in the primary combustion zones and allows the mixture to burn more fully.

Figure 7:
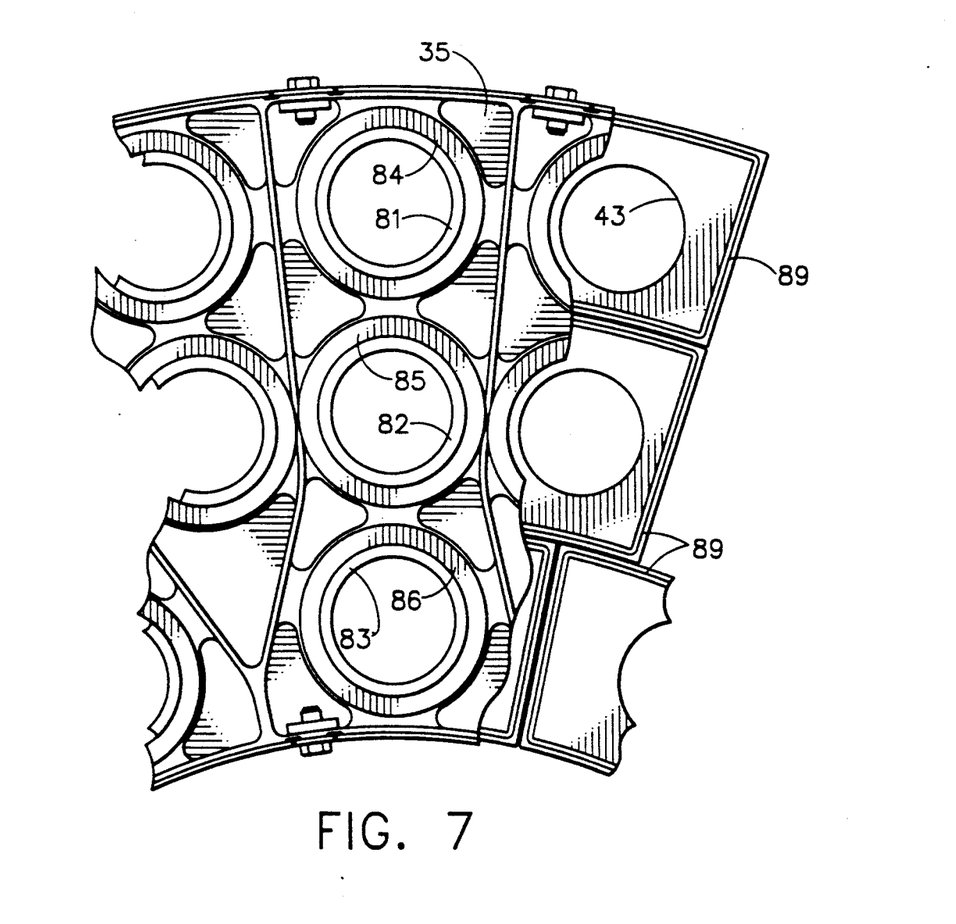
FIG. 7 is a front view of the combustor of the present invention taken along lines 7—7 in FIG. 3.

In order to operate combustor 25 at the various engine output levels, while maintaining a lean mixture of fuel and air slightly above lean blowout to sustain low emission levels, the mixers of the various domes are preferably staged (either circumferentially, radially, or a combination of the two) so that only some mixers are supplied fuel at any given time. Clearly, the triple annular configuration of combustor 25 affords the opportunity to have any number of combinations for supplying fuel to mixers 48, 50 and 52. The preferred manner of staging combustor 25 is separately described and claimed in U.S. Ser. No. 07/976,876, entitled "Fuel Supply Control System for a Gas Turbine Engine," which is hereby incorporated by reference. The middle dome 39 is the so-called pilot dome wherein mixers 48 are supplied with fuel during all phases of operation of combustor 25. Thereafter, mixers 50 and 52 of outer dome 37 and inner dome 41, respectively, will have fuel supplied thereto as required by the power requirements of the gas turbine engine. It will be noted that the number of mixers 48 and 50 in middle dome 39 and outer dome 37 (e.g., 30) is preferably twice that of mixers 52 in inner dome 41 (e.g., 15) so as to have a 3-2-3 radial arrangement (see FIGS. 7 and 8).

Figure 4:
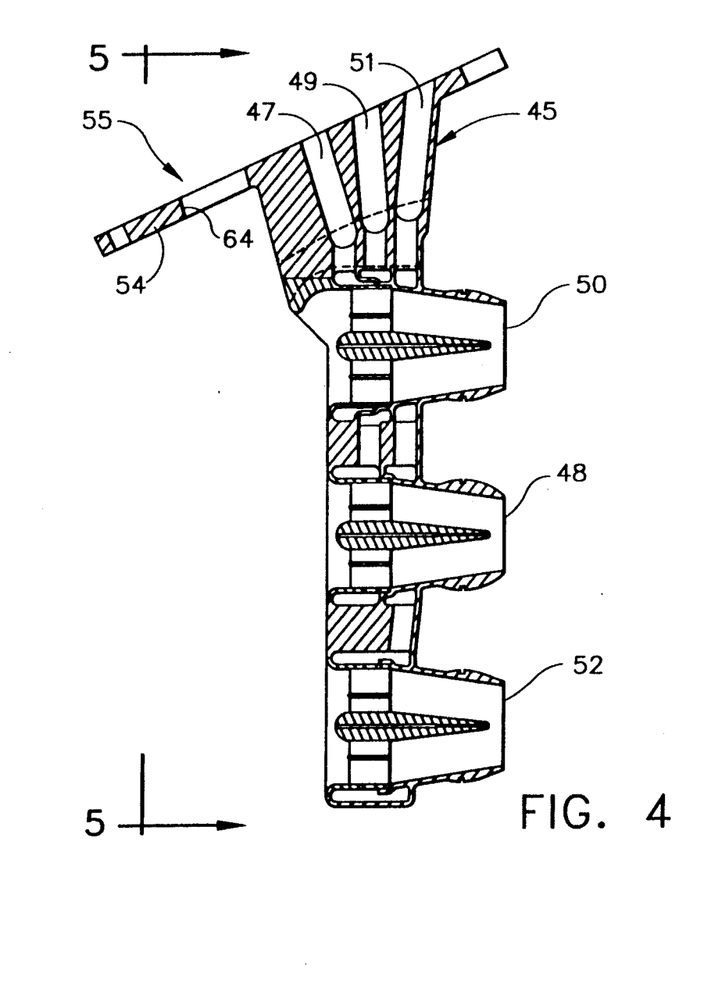
FIG. 4 is a cross-sectional view of the mixer/fuel manifold assembly in FIG. 2.
Figure 5:
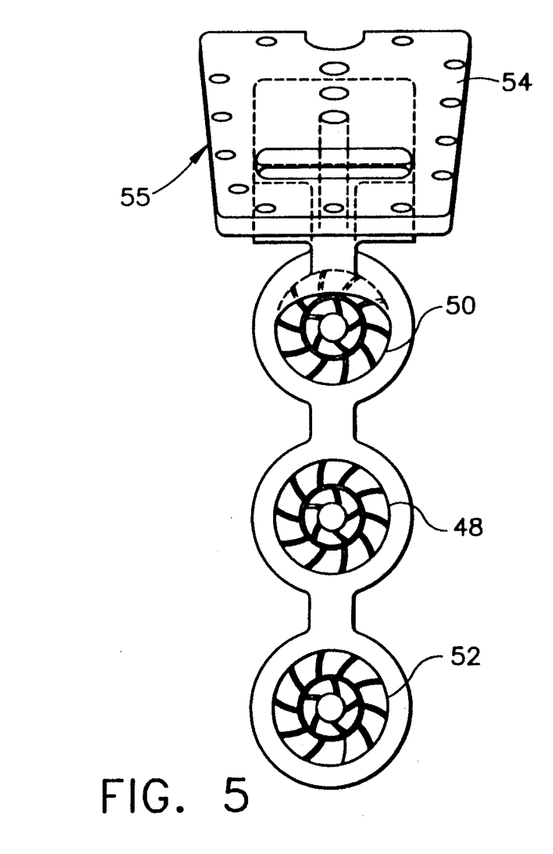
FIG. 5 is a front view of the mixer/fuel manifold assembly of FIG. 5.
Figure 6:
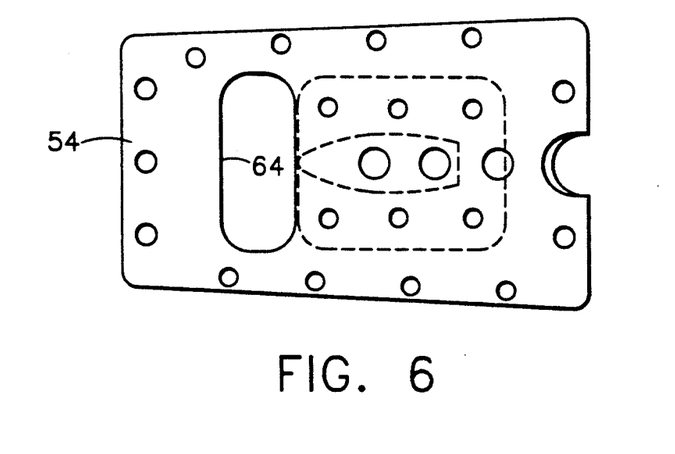
FIG. 6 is a partial top view of the mixer/fuel manifold assembly of FIGS. 4 and 5 taken along lines 6—6.
Figure 8:
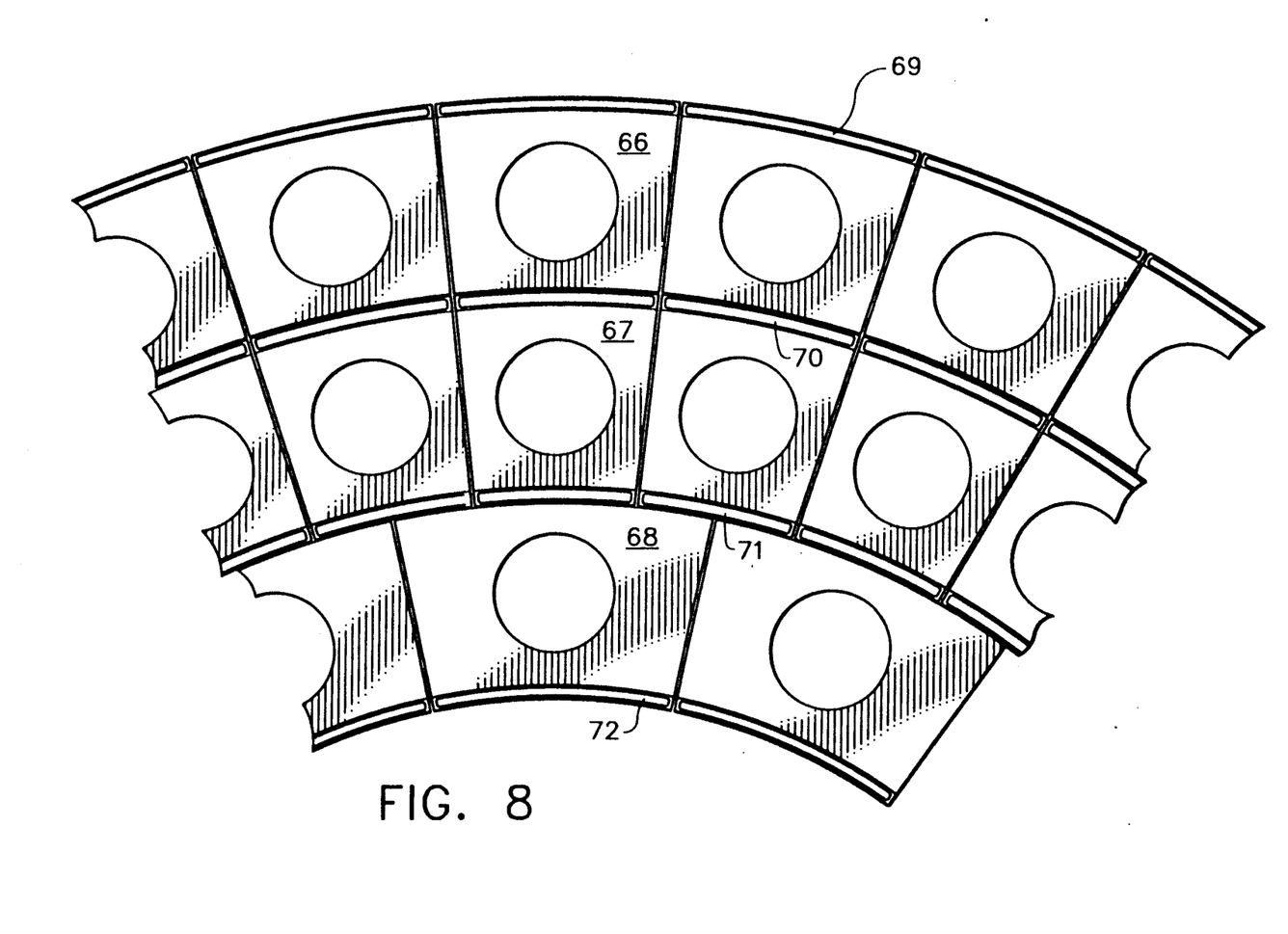
FIG. 8 is a rear view of the combustor depicted in FIG. 3 of the present invention taken along lines 8—8 therein.

As best seen in FIG. 4, a manifold system 45 includes an outer dome fuel tube 47 which supplies fuel to outer dome 37, a middle dome fuel tube 49 which supplies fuel to middle or pilot dome 39, and an inner dome fuel tube 51 which supplies fuel to inner dome 41 as allowed by the control system therefor (not shown). The preferred manner of supplying fuel is separately described and claimed in U.S. Ser. No. 07/976,874, entitled "Fuel Supply System for a Gas Turbine Engine," which is hereby incorporated by reference. In order to assist in maintaining and servicing mixers 48, 50 and 52, manifold system 45 and mixers 48, 50 and 52 are of an integral structure 55 shown in FIGS. 4 and 5. This integral structure 55 is designed to be easily removed through on opening 59 in outer casing 57. (It will be noted that some integral structures 55 will have manifolds for only outer dome mixer 50 and middle dome mixer 48 since there is only half as many inner dome mixers 52 in the 3-2-3 design, as best seen in FIG. 8).

More specifically, as shown in FIG. 2, integral structure 55 is held in place in combustor 25 by means of a plug assembly 53 which is inserted into an opening 64 in a flange portion 54 of integral structure 55. Plug assembly 53 is fastened to casing 57 by a series of fasteners 56' which connect a plug mounting plate 58, a first C seal 60, flange portion 54 and a second C seal 62 to casing 57. In order to remove integral structure 55 from combustor 25, fasteners 56' are removed and plug assembly 53 is lifted radially outward. Integral structure 55 is then able to slide upstream slightly into alignment with opening 59 in casing 57, whereupon it may be removed. The process for replacing integral structure 55 in combustor 25 is exactly opposite of that for removal, with integral structure 55 inserted through opening 59 in casing 57 and slid downstream slightly so as to engage mixers 48, 50, and 52 into ferrules 82, 81 and 83, respectively. Thereafter, plug assembly 53 is inserted through opening 64 in integral structure 55 and fastened.

It should also be noted that the manifold system 45 eliminates the use of fuel nozzles upstream of the air/fuel mixers. This is desirable since a more uniform flow distribution occurs immediately upstream of the mixers due to the lack of wakes caused by such fuel nozzles.

In order to prevent cold spots from forming between domes and/or quenching the flame in pilot dome 39, which can occur when inner dome 41 and/or outer dome 37 do not have flames burning therein, as well as protect outer and inner liners 31 and 33, heat shields 66, 67, and 68 are provided to segregate the individual primary combustor zones 61, 63, and 65, respectively. Heat shields 66, 67, and 68 are brazed to dome plate 35 and domes 37, 39 and 41, respectively, adjacent the downstream portion of mixers 50, 48, and 52. Specifically, outer dome 37 includes a heat shield 66 which includes an annular endbody 69 to help insulate outer liner 31 from flames burning in primary zone 61. Middle dome 39 includes a heat shield 67 which includes annular centerbodies 70 and 71 to segregate it from outer dome 37 and inner dome 41, respectively. Inner dome 41 includes a heat shield 68 with an annular endbody 72 in order to insulate inner liner 33 from flames burning in primary zone 65. In order to accommodate annular endbody 69, igniter 73 preferably is located immediately downstream therefrom, although annular endbody 69 could be scalloped to allow igniter 73 to penetrate therethrough.

Figure 9:
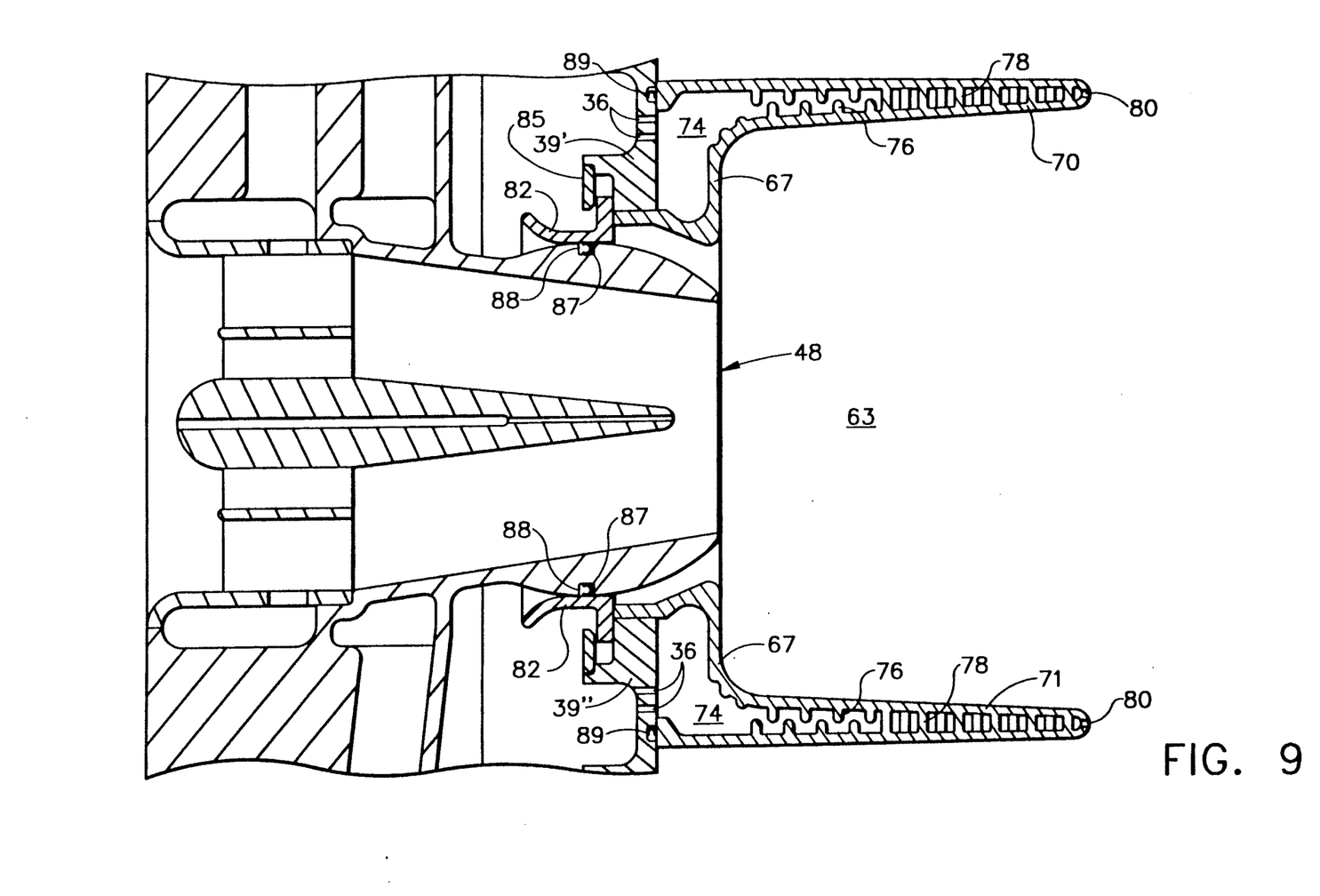
FIG. 9 is an enlarged partial cross-sectional view of the middle dome portion of the combustor depicted in FIG. 2.

Cooling of dome plate 35, heat shields, 66, 67, and 68, annular endbodies 69 and 72 and annular centerbodies 70, and 71 preferably is accomplished by less than 10% of the total combustion air. Although only a small quantity of such air is used for impingement cooling the flat section of heat shields 66, 67 and 68, the cooling air must be prevented from entering primary zones 61, 63, and 65 of combustor 25 and quenching the already lean combustion gasses. This is accomplished by directing the cooling air through holes 36 in dome plate 35 (as seen in FIG. 9) into annular endbodies 69 and annular 70 and 71 and then downstream thereof. The annular Centerbodies will have the same general configuration as that described in U.S. Ser. No. 07/859,759, entitled "Segmented Centerbody for a Double Annular Combustor," which is hereby incorporated by reference. In this design, it will be noted that each annular centerbody includes a hollow structure or impingement cavity 74 having both pins 76 and columns 78 which are utilized to improve heat transfer between the inner and outer surface of each annular centerbody as well as between the cooling air and the centerbody. A passage 80 is included at the tip of each annular centerbody so that the cooling air may exit downstream of primary zones 61, 63 and 65. It will be understood that passage 80, is the only outlet for cooling air in annular endbodies 69 and 72 and annular 70 and 71, as opposed to the dilution passages also supplied in Ser. No. 07/859,759, since no cooling air is to enter primary combustion zones 61, 63, and 65.

In order to prevent cooling air supplied to dome plate 35 from leaking between openings 43 and mixers 48, 50 and 52 into primary combustion zones 61, 63, and 65, a series of sealing measures is provided. More specifically, mixers 48, 50 and 52 are held within ferrules 81, 82, and 83 which in turn are held in position by ferrule retainers 84, 85, and 86, respectively. This arrangement allows movement of ferrules 81, 82, and 83 to relieve thermal growth differential between dome plate 35 and mixers 48, 50 and 52. In order to prevent cooling air from leaking into primary zones 63, 61 and 65, a seal 87, preferably in the form of a ring seal, is placed within a notch 88 in the outer wall of each mixer. However, other types of seals (e.g. carbon face seals, metallic O-rings and C-rings, etc.) may also be utilized. In this way, cooling air is sealed from entering primary combustion zones 61, 63, and 65 as ferrules 81, 82, and 83 adjust radially within ferrule retainers 84, 85, and 86. Thus, not only is thermal expansion provided for, but also a positive seal to allow for manufacturing tolerances and the prevention of any uncontrolled cooling air leakage.

Figure 10:
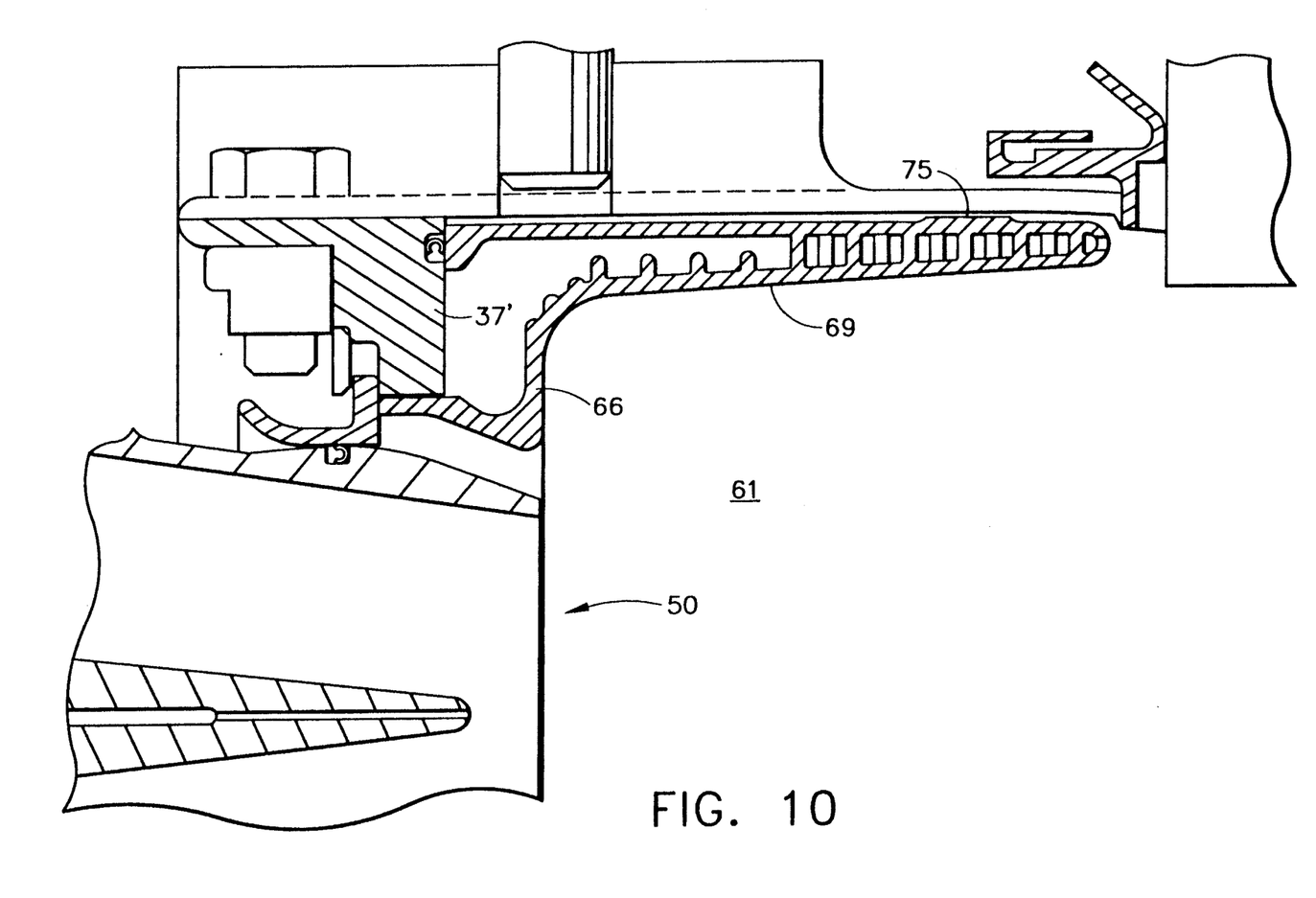
FIG. 10 is an enlarged partial cross-sectional view of the outer dome portion of the combustor depicted in FIG. 2.

In addition, it will be noted that annular endbodies 69 and 72 of heat shields 66 and 68, respectively, include stand-offs 75 which are slight thickness increases approximately mid-way along annular endbodies 69 and 72. A stand-off 75 in endbody 69 is depicted in FIG. 10. The function of stand-offs 75 is to severely restrict (but not eliminate) the amount of air circulating between outer liner 31 and heat shield 66, as well as inner liner 33 and heat shield 68.

Another set of seals 89 (as best seen in FIG. 9) is provided at the junction of heat shields 66, 67, and 68 with dome plate 35. This seal 89 can be of various types, but a C seal as known in the art is preferred. Seals 89 act to seal impingement cavity 74 in annular endbodies 69 and 72 and annular 70 and 71 from primary combustion zones 61, and 65, as well as permits thermal movement between heat shields 66, 67 and 68 and dome ends 37', 39', 39" and 41".

It should be noted that inner liner 33 and outer liner 31 are unitary in construction and do not have nuggets or other cooling holes therethrough, except for a cooling nugget at the aft ends thereof for supplying cooling air to the turbine nozzle platform. A baffle 34 is provided in both outer passage 30 and inner passage 32 in order to increase velocity of cooling air therethrough to turbine nozzle 90, whereby liners 31 and 33 may be convectively cooled. In this way, less cooling air is required in outer passage 30 and inner passage 32. Since liners 31 and 33 are backside cooled only, it is preferred that a thermal barrier coating be applied to maintain reasonable metal temperatures.

Having shown and described the preferred embodiment of the present invention, further adaptations of the combustor can be accomplished by appropriate modifications by one of ordinary skill in the art without departing from the scope of the invention.

We claim:

1. A triple annular combustor for a gas turbine engine having a compressor providing compressed airflow, said combustor having a longitudinal axis therethrough, comprising:
    (a) an outer liner;
    (b) an inner liner, radially spaced from said outer liner;
    (c) a first dome having an outer end fixedly joined to said outer liner and an inner end spaced radially from said outer end, said first dome having a plurality of circumferentially spaced first openings therein;
    (d) a second dome spaced radially inward from said first dome having an outer end fixedly joined to said first dome inner end and an inner end spaced radially from said second dome outer end, said second dome having a plurality of circumferentially spaced second openings therein;
    (e) a third dome spaced radially inward from said second dome having an outer end fixedly joined to said second dome inner end and an inner end spaced radially from said third dome outer end fixedly joined to said inner liner, said third dome having a plurality of circumferentially spaced third openings therein;
    (f) said outer and inner liners defining therebetween first, second, and third combustion zones, respectively, which operated independently of each other; and
    (g) means for supplying a fuel/air mixture to each of said first, second, and third combustion zones, wherein said compressed airflow is prevented from entering said first, second, and third combustion zones unless as a part of said fuel/air mixture.

2. The triple annular combustor of claim 1, wherein said supply means for a fuel/air mixture includes means for premixing fuel and said compressed air prior to entry in said first, second, and third combustion zones, said mixing means being disposed in each of said first, second and third openings circumferentially spaced in said first, second and third domes.

3. The triple annular combustor of claim 2, wherein said supply means for a fuel/air mixture includes a fuel manifold for supplying fuel to each of said mixing means.

4. The triple annular combustor of claim 3, further including a means for controlling fuel flowing from said manifold to said mixing means, wherein each of said mixing means of said first, second, and third domes is selectively supplied with fuel.

5. The triple annular combustor of claim 4, wherein said fuel/air mixture is maintained lean throughout all stages of combustor operation.

6. The triple annular combustor of claim 2, wherein there is twice the number of mixing means in said first and second domes than in said third dome.

7. The triple annular combustor of claim 4, wherein the mixing means in said second dome is always supplied with fuel during combustor operation.

8. The triple annular combustor of claim 2, further including a diffuser between said compressor and said triple annular combustor, wherein 70% of more of said compressed airflow is directed through said mixing means.

9. The triple annular combustor of claim 1, further including a diffuser between said compressor and said triple annular combustor, wherein 15% or less of said compressed airflow is directed to said first, second, and third domes for impingement cooling thereof.

10. The triple annular combustor of claim 4, wherein each of said combustion zones is maintained in a temperature range of 2500 to 3000° F.

11. The triple annular combustor of claim 1, wherein the volume of said combustor provides residence times of said fuel/air mixture in said first, second and third combustion zones in the range of 2 to 5 milliseconds.

12. The triple annular combustor of claim 3, wherein said fuel manifold includes a first fuel tube to supply to said first dome, a second fuel tube to supply fuel to said second dome, and a third fuel tube to supply fuel to said third dome.

13. The triple annular combustor of claim 3, said mixing means and said manifold being an integral structure, wherein said structure is removable from and insertable into said combustor as an individual module.

14. The triple annular combustor of claim 2, further including first, second and third ferrules into which said mixing means is positioned and first, second and third ferrule retainers to maintain said first, second and third ferrules within said first, second and third dome openings.

15. The triple annular combustor of claim 1, further including first, second and third heat shields fixedly joined to said first, second and third domes.

16. The triple annular combustor of claim 15, wherein said first heat shield includes an annular endbody adjacent the outer end of said first dome to insulate an upstream end of said first combustion zone from said outer liner, said second heat shield includes annular centerbodies adjacent the outer and inner ends of said second dome to insulate an upstream end of said second combustion zone from said first and third combustion zones, and said third heat shield includes an annular endbody adjacent the inner end of said third dome to insulate an upstream end of said third combustion zone from said inner liner.

17. The triple annular combustor of claim 16, wherein each annular centerbody and annular endbody of said first, second and third heat shields includes a passage at the tip thereof, wherein air for impingement cooling said first, second and third domes escapes downstream of said first, second and third combustion zones.

18. The triple annular combustor of claim 14, further including means for sealing compressed air from flowing between said first, second and third ferrules and said mixing means.

19. The triple annular combustor of claim 15, further including means for sealing compressed air from flowing between the junctions of said first, second, and third heat shields and said first and third domes, respectively.

20. The triple annular combustor of claim 16, wherein the annular endbodies of said first and third heat shields include stand-offs on their outer and inner surfaces, respectively, to constrict air flow circulating between said outer liner and said first heat shield and said inner liner and said third heat shield.

21. The triple annular combustor of claim 1, further including a casing surrounding said outer and inner liners to form an outer passage and an inner passage, respectively, wherein air passes therethrough to convectively cool said inner and outer liners, said outer and inner passages including a baffle therein to increase the velocity of air therethrough.

* * * * *